F. W. H. CLAY.
SLED.
APPLICATION FILED JAN. 26, 1916.
1,191,281.
Patented July 18, 1916.
2 SHEETS—SHEET 1.
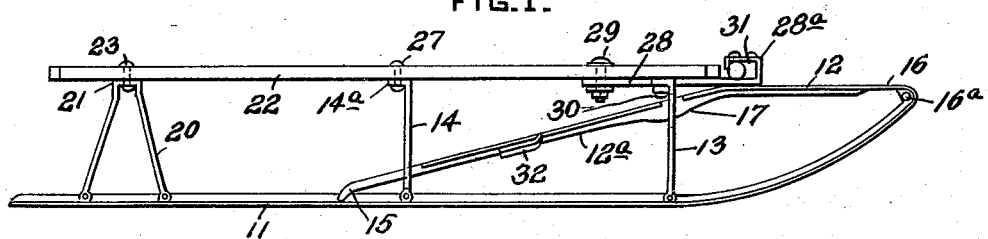
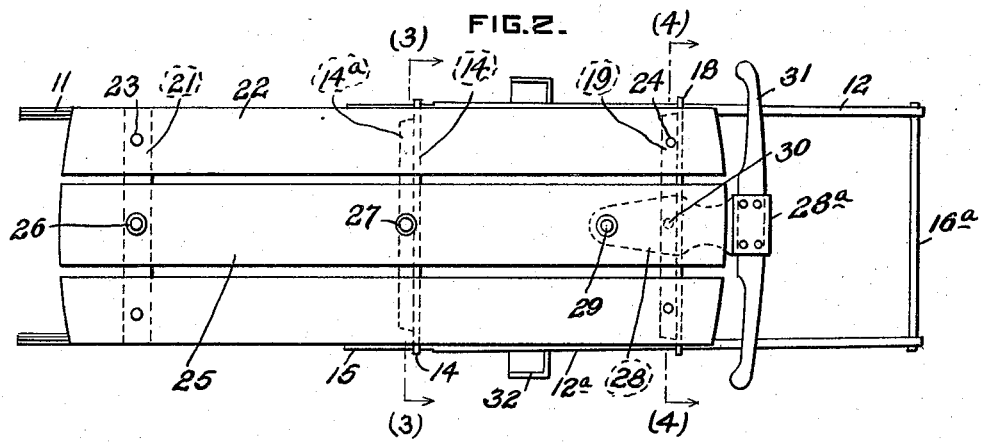
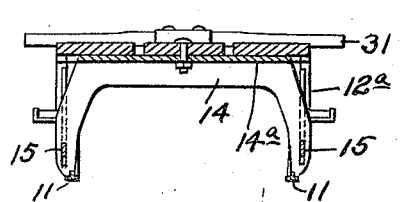
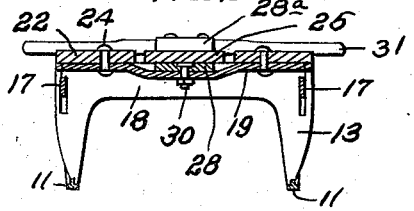
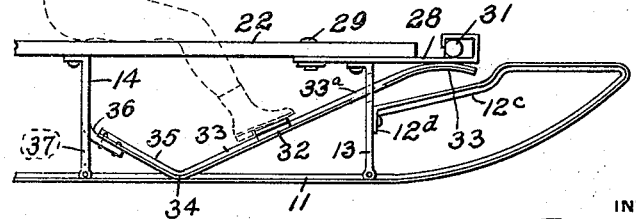
WITNESSES
J. Herbert Bradley.
Edwin O. Johns
INVENTOR:
Francis W. H. Clay.
by Jo. Baily Brown,
his attorney.

F. W. H. CLAY.
SLED.
APPLICATION FILED JAN. 26, 1916.
1,191,281.
Patented July 18, 1916.
2 SHEETS—SHEET 2.
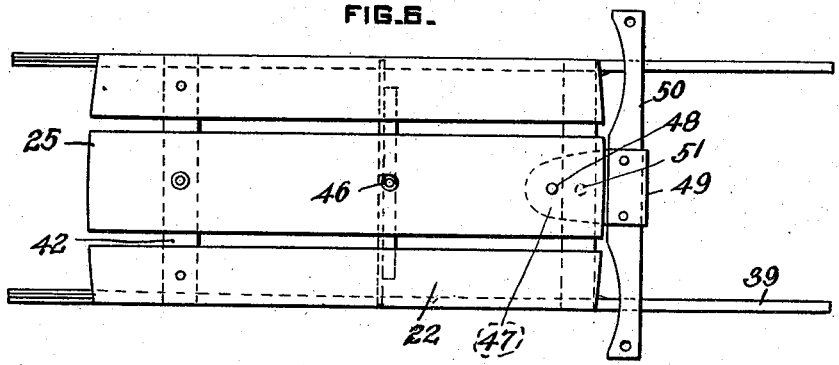
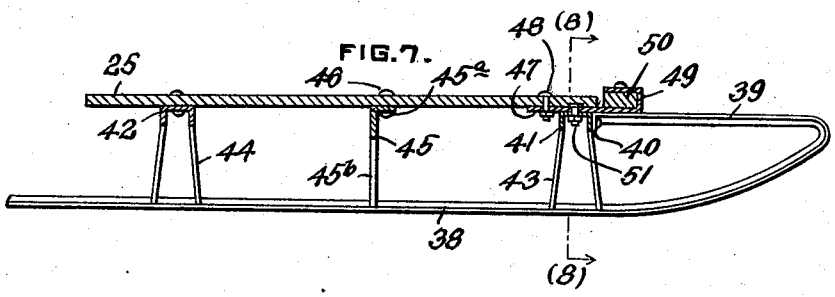
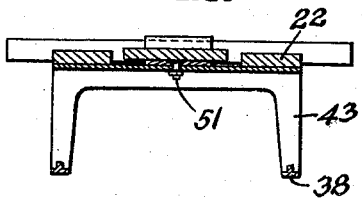
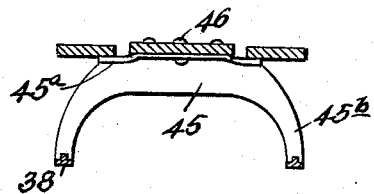
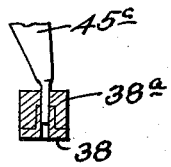

UNITED STATES PATENT OFFICE.

FRANCIS W. H. CLAY, OF EDGEWOOD PARK, PENNSYLVANIA, ASSIGNOR TO JO. BAILY BROWN, OF PITTSBURGH, PENNSYLVANIA.

SLED.

1,191,281. Specification of Letters Patent. Patented July 18, 1916.

Application filed January 26, 1916. Serial No. 74,355.

*To all whom it may concern:*

Be it known that I, FRANCIS W. H. CLAY, a citizen of the United States, residing at Edgewood Park, in the State of Pennsylvania, have invented certain new and useful Improvements in Sleds, of which the following is a specification.

My invention relates to means for controlling such sleds as are used for coasting; its primary objects are to increase the efficiency of steering; to provide for several modes of steering; to provide a brake for stopping the sled when safety so requires; and furthermore, to simplify, cheapen and strengthen the mechanical design of steering sleds.

The invention is illustrated in several forms in the accompanying drawings, in which:

Figure 1 is a side elevation of a sled embodying my improvements, and Fig. 2 is a plan of the same; Fig. 3 is a section on the line (3—3) in Fig. 2; Fig. 4 is a section on the line (4—4); Fig. 5 is a partial elevation of a modified form of the brake; Fig. 6 is a plan of another and more simple form of steering mechanism, and Fig. 7 is a side elevation. Figs. 8 and 9 are cross sections respectively on the lines (8—8) and (9—9) in Fig. 7. Fig. 10 is a further modified detail.

Steering sleds in which the runner is flexed laterally by bending the whole forward end of the sled out of line, inherently require the forward end to be of a comparatively weak and flimsy structure; and moreover such construction has the defect of causing the greatest bend where it is not effective because not under the center of weight of the rider. I cure this defect by arranging for flexing the runner between two rigid supports. Again it frequently happens that even a very considerable flexing of the runner is not sufficient for turning sharp corners; and to cure this defect I provide a brake, for friction on the ground, in order to retard the velocity of the inside runner in turning a curve. No steering sleds of which I am aware have any provision for stopping the sled on a curve, a thing often desired; and to supply this want I arrange friction devices so that when desired they may be applied on both sides at once, and thus stop the progress of the sled.

In the sled as shown in Figs. 1 to 4, I provide a runner shoe 11 made of T-iron of proper shape bent back on itself at the front to form the horizontal stiffening bar 12, and continuing also through a slot in the leg or brace 13 and through the supplementary middle brace 14 and ending in a pointed end 15 arranged to drag on the ground upon being depressed as hereafter described. The web of the T-iron may be cut out at the point 16 as shown in order to make the flexing easier, and at the point 17 where the web passes through the leg 13 I find it preferable to widen it as shown, for greater rigidity. It will be seen from Fig. 4 that the leg 13 is integral with the cross brace 18 and its horizontal flange 19, and this leg therefore holds the runner shoe 11 rigidly at this point. The leg may be attached to the shoe either by slitting as shown in Fig. 4, or may be bent and riveted on, or both. The rear cross bar 21 and legs 20 are of virtually the same construction as in front except for duplicating the leg in order to add longitudinal rigidity.

The side top boards 22 are rigidly fastened by rivets 23 and 24, to the cross braces 21 and 18 respectively, but are not attached to the horizontal flange 14$^a$ of the supplementary middle brace 14. A separate middle board 25 is provided and is pivoted by a bolt 26 to the rear cross brace 21, and likewise by a bolt 27 to the middle brace 14. At the forward end this board 25 slides freely over the front brace 18 but rests directly upon a metal plate 28 which is pivoted to it a short distance back of the front brace, by a bolt 29, and is itself pivoted by a countersunk bolt 30, to the middle point of the flange 19 of the front cross brace 18, and from this point extends forward to a loop 28$^a$, which embraces and is rigidly fixed to the wooden cross bar 31 used for steering. The bottom end of the intermediate cross brace 14 being fixed to the runner shoe 11, as shown in Fig. 3, it will be obvious that an angular turn of the steering bar 31 will, by means of the bolt 29, cause a lateral swinging of the front end of the board 25, and therefore move the middle point of the runner shoes 11 laterally with respect to the front and back legs 13 and 20 and thus give a curve to the runner shoes.

The lever plate 28 is narrowed between the pivot 30 and the loop 28$^a$ so that it may with comparative ease be given a vertical twist, and, the cross bar 31 resting on the extension 12 and the brake lever 12ᵃ, it will be obvious that a depression of the end of the steering bar 31 will depress the brake 15 and cause it to come in contact with the ground. It is usually an instinctive action, to simultaneously depress the end of the steering bar which the rider is pulling; so that the steering action of concavely bending the inner runner and at the same time applying the drag or brake, will give a double steering action, as intense as may be desired. It will also be observed that when the operator simply depresses the entire steering bar, that is both ends of the bar 31, he will cause both of the brakes 15 to drag on the ground, and may therefore stop the sled in order to avoid accidents as it frequently becomes necessary on icy ground. Of course when the sled is used on icy ground where the flexing of the runner is not very effective, he will usually omit to flex the runner and use the drag or brake entirely, which may be done by a vertical movement of the steering bar in place of the usual horizontal movement.

On the portion 12ᵃ of the brake bar I preferably also supply a foot rest 32 so that the brake and steering apparatus may be operated by several riders at once, or by a rider sitting upright where he cannot reach the bar 31. This is particularly valuable for girl riders who seldom lie flat upon the sled, and is always an additional safety device. To make it still more powerful and effective I sometimes arrange the brake bar as shown in Fig. 5, where it is formed of a diagonal portion 33, extending forward under the steering bar 31, passing through a slot in the leg 13 by its flat portion 33ᵃ as before, making a sharp turn near the bottom of the runner 11, at the point 34, and then continuing upward diagonally by stiff portion 35 rigidly attached to a spring tongue 36 which may be conveniently made by cutting a slot (37) in the vertical leg of the brace 14 and bending outward as shown. In this case the top bar 12ᶜ of the frame is preferably depressed to make room for the movement of the brake 33 and fixed by a downturned lug 12ᵈ to the front leg 13. The rider may therefore with his foot entirely control the brake and with a very powerful purchase on the ground.

In Figs. 6 to 9 I have shown another and more simple form of steerable sled without the brake or safety devices.

The runner 38 is made of T-iron, and at the forward end is returned with the free end 39 riveted to the cross brace 41 by the down-turned lug 40. The cross braces 41 and 42 and legs 43, 44 may be made of sheet metal bent as shown. The middle brace 45 is made of the form shown in Fig. 9; its horizontal flange 45ᵃ is fastened by bolt 46 to the middle board 25 of the top, which, as before, is pivoted to the rear cross brace 42 and at the forward end not attached to the front brace 41, but pivoted to the lever plate 47 by bolt 48, and the plate has a loop 49 folded about the steering bar 50. The lever plate is attached by a bolt 51 to the front brace bar 41.

It will be obvious that as the steering bar 50 is vibrated about the pivot 51 it will laterally move the front end of the center top board 25 about its rear pivoting point, and laterally move the cross brace 45 and flex the runner 38, with respect to the rest of the sled. This form of structure is recommended by its cheapness and simplicity, there being no addition to the structure of the ordinary sled except the steering bar 50 and the plate 47. Of course it will be understood that it is not necessary that the braces be of metal, since they could as well be made of wood, employing any convenient form of legs to attach the runner, but always the structure should be stiff except as to the center of the runner. It is also immaterial to my invention how the brace 45 is attached to the flexible shoe or runner; for example, it might well be done by providing the end of the brace 45ᶜ with a pin fitting in a bored hole in the shoe, in which case the shoe should have a reinforced block 38ᵃ at that point, as shown in Fig. 10.

It is to be noted that with this device especially as shown in the first five figures, the rider has a complete control of the sled, in any position of his body he chooses to take. Sitting up, he may manipulate the steering bar with ropes in his hands, or with his feet, or may manipulate the brakes with his feet. When lying down, the cross bar can be operated by the hands, and in case of necessity the brake bars may also be operated by the knees or directly by the hands. Ordinarily the rider will do the steering by the simple lateral flexing of the runner by means of the steering bar. When a more sharp or sudden turn is desired, or when there is danger of lateral sliding, he may bring the drag into play on either side simply by an extra downward pressure on the end of the steering bar on that side. In case the rider is in danger, and wishes to stop, a downward pressure on the two ends of the steering bar will generally be applied instinctively, as also the applying of the knees or feet to the foot rest on the brake. The rider is not dependent upon one method of steering; he has two separate means of control; and moreover is provided with a perfectly efficient safety device, requiring no thought to operate. The very instinctive act of raising the head to avoid danger will operate to apply the brake.

Other advantages will readily occur to those familiar with the art.

Having thus described my invention and illustrated its use, what I claim is the following:

1. A safety steering sled comprising a rigid frame, flexible runner shoes attached thereto forward and back, a drag alongside the free portion of the runners and means to simultaneously flex the shoes between fixed supports and apply the brake.

2. A sled provided with a frame having two rigid supports for the runner shoe, means to flex the shoe between said supports, and to apply friction to the ground alongside the runner.

3. A steering sled provided with a rigid frame having two fixed supports for the runner shoe, means to flex said shoe between said fixed supports, a brake adapted to be brought in contact with the ground alongside the runner, and a single handle effecting both operations.

4. The combination of a sled provided with means for flexing the runner shoe, a drag adapted to be depressed on the ground alongside each runner, and a single handle adapted to flex both shoes laterally, to depress either one of said brakes alone, and to simultaneously depress both brakes, substantially as described.

In testimony whereof I have hereunto signed my name.

FRANCIS W. H. CLAY.

Copies of this patent may be obtained for five cents each, by addressing the "Commissioner of Patents, Washington, D. C."